United States Patent [19]

Melton et al.

[11] Patent Number: 5,037,627

[45] Date of Patent: Aug. 6, 1991

[54] HYPOCHLOROUS ACID PROCESS

[75] Inventors: James K. Melton; John H. Shaffer; Garland E. Hilliard, all of Cleveland, Tenn.; John A. Wojtowicz, Cheshire, Conn.

[73] Assignee: Olin Corporation, Cheshire, Conn.

[21] Appl. No.: 424,681

[22] Filed: Oct. 25, 1989

Related U.S. Application Data

[63] Continuation-in-part of Ser. No. 264,667, Oct. 31, 1988, abandoned, and a continuation-in-part of Ser. No. 153,303, Feb. 8, 1988, abandoned.

[51] Int. Cl.$^5$ .............................................. C01B 11/04
[52] U.S. Cl. .................................................... 423/473
[58] Field of Search .................... 423/473; 252/187.32

[56] References Cited

U.S. PATENT DOCUMENTS

| | | | |
|---|---|---|---|
| 1,403,993 | 1/1922 | Wallace et al. | 423/473 |
| 1,748,897 | 2/1930 | Oppe | 423/473 |
| 3,914,397 | 10/1975 | Mueller | 423/462 |
| 4,146,578 | 3/1979 | Brennan et al. | 423/473 |
| 4,147,761 | 4/1979 | Wojtowicz et al. | 423/473 |

FOREIGN PATENT DOCUMENTS 102806A 6/1984 Japan.
543944 7/1942 United Kingdom.

*Primary Examiner*—Jeffrey E. Russel
*Attorney, Agent, or Firm*—James B. Haglind; Paul Weinstein

[57] ABSTRACT

A process for producing hypochlorous acid by reacting an aqueous solution of an alkali metal hydroxide in droplet form with gaseous chlorine to produce hypochlorous acid vapor and solid alkali metal chloride particles in which the improvement comprises employing molar ratios of gaseous chlorine to the alkali metal hydroxide of at least about 22:1.

The process achieves high yields of hypochlorous acid by minimizing side reactions including the formation of chlorate as an impurity in the alkali metal chloride particles produced.

The hypochlorous acid solution produced contains from about 35 to about 60 percent by weight of HOCl, a dissolved chlorine concentration of less than about 2 percent by weight, and is substantially free of alkali metal ions and chloride ions.

23 Claims, No Drawings

HYPOCHLOROUS ACID PROCESS

This application is a continuation-in-part of Ser. No. 07/264,667, filed Oct. 31, 1988, now abandoned, and is a continuation-in-part of Ser. No. 07/153,303, filed Feb. 8, 1988, now abandoned.

This invention relates to an improved process for producing concentrated hypochlorous acid solutions which are essentially free of ionic impurities.

Hypochlorous acid has been used in the preparation of available chlorine compounds such as calcium hypochlorite, chloramines, and chloroisocyanuric acid compounds.

Previous methods of hypochlorous acid preparation have included those which react chlorine gas with water or an aqueous solution of an alkali metal hydroxide to form dilute aqueous solutions of hypochlorous acid or an alkali metal hypochlorite. These dilute aqueous hypochlorous acid solutions, which contain chloride ions and may contain alkali metal ions, are concentrated by distillation. Processes using this method are described by E. P. McElroy in U.S. Pat. No. 1,510,790, Oct. 7, 1924; in British Patent No. 543,944, published Mar. 20, 1942; and by C. C. Crawford et al in U.S. Pat. No. 2,347,151, Apr. 18, 1944.

These references also mention condensing the HOCl distillate to recover the hypochlorous acid but provide no details of the condensation.

However, distillation of hypochlorous acid or hypochlorite solutions in the presence of chloride ions as practiced in the above processes results in the formation of chlorate ions by decomposition of HOCl and a substantial reduction in the yield.

U.S. Pat. No. 1,748,897, published by Oppe on Feb. 25, 1930, describes a process for preparing a solid mixture of alkali metal hypochlorite and alkali metal chloride by reacting chlorine gas with a spray of alkali metal hydroxide, while cooling the reactants and product to effect condensation. The product of this technique is a solid mixture of alkali metal hypochlorite and alkali metal chloride, which has very limited utility.

More recently, a process has been described in U S. Pat. No. 4,146,578, issued Mar. 27, 1979 to J. P. Brennan et al in which hypochlorous acid vapor is produced by spraying an aqueous alkali metal hydroxide in droplet form or solid alkali metal hydroxide particles into gaseous chlorine. The process is operated using excess amounts of chlorine to alkali metal hydroxide including those up to about 20 times the stoichiometric amount. The reaction is conducted at temperatures which vaporize the hypochlorous acid as it forms to separate the hypochlorous acid vapors from the solid alkali metal chloride particles. The hypochlorous acid vapors are then scrubbed with water to produce a hypochlorous acid solution. The scrubbing is generally carried out at temperatures in the range of 0° to 30° C., however, Brennan et al teach that at temperatures below about 9.6° C. there is a tendency to form solid chlorine octahydrate which precipitates in the scrubber.

Moreover, scrubbing the hypochlorous acid vapors in water reduces the concentration of the hypochlorous acid product.

To achieve high yields of hypochlorous acid in processes which react chlorine gas with droplets of an alkali metal hydroxide, it is necessary to minimize side reactions including the formation of chlorate as an impurity in the alkali metal chloride particles produced.

In addition, it is desirable to produce solid alkali metal chloride particles which have low moisture concentrations as these particles can be readily recovered from the reactor and the scaling or caking of reactor surfaces or components with salt is minimized.

Further, to produce highly concentrated solutions of hypochlorous acid it is necessary to limit the amount of water present in the process.

An object of the present invention is to provide a process for producing increased yields of hypochlorous acid vapors.

Another object of the present invention is to provide a process for producing hypochlorous acid vapors and solid alkali metal chlorides in which the solid alkali metal chloride particles have low concentrations of chlorate.

An additional object of the present invention is to provide a process for producing hypochlorous acid vapors and solid alkali metal chloride particles having low concentrations of moisture.

Yet another object of the present invention is to provide a process for producing highly concentrated aqueous solutions of hypochlorous acid which are free of ionic impurities.

These and other advantages are accomplished in a process for producing hypochlorous acid by reacting an aqueous solution of an alkali metal hydroxide in droplet form with gaseous chlorine to produce hypochlorous acid vapors and solid alkali metal chloride particles in which the improvement comprises employing molar ratios of gaseous chlorine to the alkali metal hydroxide of greater than about 22:1.

More in detail, the process is carried out in a suitable reactor such as one provided with means for spraying discrete droplets of an aqueous solution of an alkali metal hydroxide into the reactor; means for feeding gaseous chlorine into the reactor; means for withdrawing solid alkali metal chloride product from the reactor; and means for withdrawing a gaseous mixture comprised of hypochlorous acid, chlorine monoxide, unreacted chlorine and water vapor from the reactor.

The reactor and/or reactant feed lines are provided with suitable heating means for maintaining the reaction mixture at a temperature sufficiently high to vaporize the hypochlorous acid product and water and to dry the alkali metal chloride particles.

Any alkali metal hydroxide capable of reacting with gaseous chlorine to form hypochlorous acid may be employed as a reactant in the process of this invention. Typical examples of suitable alkali metal hydroxides include sodium hydroxide, potassium hydroxide, lithium hydroxide and mixtures thereof. Sodium hydroxide is the preferred reactant since the resulting sodium chloride by-product is more easily disposed of than the other alkali metal chlorides.

As gaseous mixtures having high concentrations of hypochlorous acid and chlorine monoxide are desired, highly concentrated aqueous solutions of the alkali metal hydroxide are used. Suitable concentrations include those in the range of from about 40 to about 80, and preferably from about 45 to about 60 percent by weight of alkali metal hydroxide.

The alkali metal hydroxide solution is sprayed from at least one atomizer preferably positioned at or near the top of the reactor.

The atomizer is preferably positioned along the central axis of a cylindrical reactor, to provide minimum contact between the atomized droplets and the walls.

The atomizer may be directed up, down, sideways or any other orientation that meets the above conditions.

Droplet sizes are selected which permit a substantially complete reaction of the droplets of alkali metal hydroxide with chlorine, the vaporization of hypochlorous acid and water produced and the production of substantially dry alkali metal chloride particles having low concentrations of chlorate.

The dry alkali metal chloride particles produced, while smaller than the original droplets, are preferably sufficiently large enough to prevent a significant portion of the particles from being entrained in the gaseous mixture produced.

Typical atomizing techniques of the pneumatic, hydraulic, and spinning disc type, among others, which are suitable for use in the process of this invention, are described in the monograph entitled "Atomization and Spray Graining" by W. R. Marshall, Jr., Chemical Engineering Progress Monograph Series, No. 2, Volume 50, 1954. A gas, such as chlorine gas, under pressure may be used to atomize droplets of aqueous alkali metal hydroxide by premixing before discharge from the nozzle, or the liquid droplets and chlorine gas are mixed after discharge from their respective nozzles. The chlorine gas which reacts with the alkali metal hydroxide may be fed directly to the reactor/or mixed with an inert gas such as air or nitrogen before being fed to the reactor.

The process of the present invention is conducted at temperatures which are sufficiently high to vaporize the hypochlorous acid as it is formed. Vaporization of the hypochlorous acid and water present provides effective separation from the alkali metal chloride particles produced. The alkali metal particles recovered are substantially dry and have low concentrations of chlorate as an impurity. Generally temperatures in the range from about 75° C. to about 150° C., and preferably from about 90° to about 140° C. at atmospheric pressure or less are employed. In a preferred embodiment, the gaseous mixture of chlorine and chlorine monoxide being recycled to the reactor is heated as this provides better control of the reaction temperature.

Generally, the pressure in the reactor ranges from about 2 to about 100 psia, and preferably from about 10 to about 20 psia. However, higher or lower pressures may be employed if desired.

The reaction time between gaseous chlorine and the droplets of alkali metal hydroxide to produce hypochlorous acid is virtually instantaneous.

The reactions which take place during operation of the process of the invention can be illustrated by the following equations:

$$Cl_2+NaOH \rightarrow HOCl(g)+NaCl(s) \quad (1).$$

$$3Cl_2+6NaOH \rightarrow Na(ClO_3)+5NaCl+3H_2O \quad (2)$$

To suppress the formation of chlorate as illustrated by equation (2), suitable excess amounts of chlorine gas are employed. These excess amounts include those in which the molar ratio of chlorine to alkali metal hydroxide is at least about 22:1. For example, excess amounts of chlorine may include molar ratios from 22:1 to about 200:1, preferably from about 25:1 to about 100:1, and more preferably from about 25:1 to about 50:1.

The novel process of the invention reacts chlorine gas with droplets of an alkali metal hydroxide which initially have a high pH. Upon contact with the chlorine gas the pH at the surface of the droplet is reduced. The use of high molar ratios of chlorine to alkali metal hydroxide is believed to result in a reduction of the pH on the surface of the droplet to a range in which the formation of hypochlorous acid on the surface of the droplet is promoted. Thus a large excess of chlorine used promotes the process of equation (1) above resulting in the formation of thin films of hypochlorous acid on the droplet surface which readily evaporate. At lower molar ratios of chlorine to alkali metal chloride the pH on the surface of the droplet is raised and the formation of hypochlorite ions which further react to produce chlorate, the reaction of equation (2) is promoted. Excesses of chlorine are employed which result in a pH on the surface of the alkali metal hydroxide droplet in the range of from about 1 to about 5, and preferably from about 2 to about 4.

These large excesses of chlorine gas thus result in increased yields of hypochlorous acid as the formation of chlorate is suppressed and its concentration in the alkali metal chloride particles reduced to less than about 10 percent by weight, and preferably less than about 6 percent by weight. In addition, the use of large excesses of chlorine gas provide an improved method of maintaining the reaction temperature in the reactor for producing the gaseous mixture.

In a continuous process, the gaseous mixture of hypochlorous acid vapor, water vapor, chlorine gas, and chlorine monoxide gas produced in the reactor is removed from the reactor and passed through a solids separator to remove any fine particles of alkali metal chloride which may be present.

The gaseous mixture comprised of hypochlorous acid vapor, chlorine monoxide, chlorine, and water vapor used in the process of the present invention contains high concentrations of HOCl and $Cl_2O$. The chlorine monoxide is formed by the conversion of HOCl vapors during the vaporization process according to the equation:

$$2HOCl \rightarrow Cl_2O+H_2O \quad (3)$$

To produce highly concentrated hypochlorous acid solutions, the concentration of water in the gaseous mixture is maintained in the range of from about 10 to about 25 mole %, and preferably at from about 13 to about 20 mole %. In a preferred embodiment substantially all of the water vapor present in the gaseous mixture removed from the reactor is provided by the aqueous solution of alkali metal hydroxide employed in the reaction.

The gaseous mixture may also contain fine particles of the alkali metal chloride which are entrained. Fine particles may be removed by any suitable separation means, for example, by passing the gaseous mixture through a gas filter medium or through a solid separator such as a cyclone.

Moist solid particles of alkali metal chloride entrained in the gaseous mixture of hypochlorous acid or present during the concentration of hypochlorous acid reduce the yield of hypochlorous acid, and if dissolved in the hypochlorous acid solution product lower the stability of the solution.

The solids-free gaseous mixture is fed to a condenser. The condenser is operated at temperatures which produce concentrated aqueous solutions of hypochlorous acid without condensing undesirable amounts of chlorine or liquid chlorine monoxide. Surprisingly, it has been found that the gaseous mixture can be condensed at temperatures well below those at which solid chlorine hydrates are normally formed without precipitating these solid compounds or forming ice crystals in the hypochlorous acid solution.

Suitable temperatures for operating the condensation process include those in the range of from about −5° C. to about +20° C., preferably at from about −5° C. to about +10° C. and more preferably in the range of from about 0° to about 5° C. at pressures of about 3 to about 10 torr. The condensation of the gaseous mixture can be operated at higher or lower pressures if desired.

The novel concentrated hypochlorous acid solutions produced are highly pure and have improved stability. The dissolved chlorine concentration in the hypochlorous acid solution of the present invention is less than about 2 percent, and preferably less than about 1 percent by weight. The concentrated hypochlorous acid solution is substantially free of ionic impurities such as alkali metal, chloride, and chlorate ions. Concentrations of the chloride ion are less than about 50 parts per million; the alkali metal ion concentration is less than about 50 parts per million; and the chlorate ion concentration is no more than about 100 parts per million.

The hypochlorous acid solutions recovered from the condenser have a concentration in the range of from about 35 to about 60, and preferably from about 40 to about 55 percent by weight of HOCl. The highly concentrated solutions have densities, for example, in the range of from about 1.15 to about 1.26, preferably from about 1.17 to about 1.24, and more preferably of from 1.19 to about 1.23 grams per milliliter (gm/ml) at a temperature in the range of from 10° to 15° C. The novel solutions of the present invention have a golden color which deepens as the concentration of HOCl increases.

The uncondensed gaseous mixture recovered from the condenser is substantially anhydrous. While the chlorine monoxide concentration is significantly reduced, the chlorine gas concentration is substantially the same as that in the original gaseous mixture fed to the condenser.

As the process of the present invention is preferably operated continuously, the uncondensed gaseous mixture is returned to the reactor which generates the HOCl—Cl$_2$O gaseous mixture, preferably after passing through a heat exchanger to raise the temperature.

Employing large excess amounts of chlorine in the process of the invention provides the gas mixture for recycle with increased stability and safety in operation as it minimizes the chance of an explosion of gaseous chlorine monoxide which can be initiated by a spark or heat. Thus, it is desirable to maintain chlorine monoxide concentrations of less than about 40 percent, and preferably less than 30 percent, for example, from about 5 to about 25 percent by volume in the gaseous mixture of chlorine and chlorine monoxide for recycle. These concentrations are readily achieved by employing molar ratios of chlorine gas to the alkali metal hydroxide of at least about 22:1.

Employing large excess amounts of chlorine gas produces dry solid particles of alkali metal chloride having low concentrations of moisture and minimal amounts of chlorate as an impurity. The alkali metal chloride particles can be removed readily from the reactor and results in reduced scaling or caking of salt on reactor surfaces or components.

The process of the invention further results in high yields of hypochlorous acid vapor as only small amounts of the product react to produce the chlorate impurity.

The concentrated aqueous hypochlorous acid solution produced by the novel process of the present invention can be used as a bleaching or sanitizing agent. Further, according to the invention, the concentrated hypochlorous acid can be employed in the production of chloroisocyanuric acid compounds such as dichloroisocyanuric acid or trichloroisocyanuric acid by feeding the concentrated HOCl solution to a reactor containing cyanuric acid or an alkali metal cyanurate. For example, the production of trichloroisocyanuric acid by the reaction of hypochlorous acid with cyanuric acid is represented by the following equation:

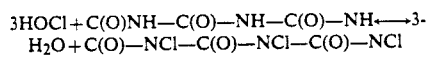

Likewise, calcium hypochlorite, a commercial sanitizing and disinfecting agent for water bodies such as swimming pools, can be produced in accordance with the invention by reacting a slurry of lime with the concentrated hypochlorous acid solution. Similarly the production of highly pure alkali metal salts of hypochlorous acid can be produced, including sodium hypochlorite and lithium hypochlorite. In addition, the concentrated hypochlorous acid solutions can be employed as the hypochlorinating agent in improved processes for the production of chlorohydrins and other chlorinated organic compounds.

To further illustrate the novel process of the present invention, the following example is presented without the intention of being limited thereby. In the examples the concentration of hypochlorous acid vapor and chlorine monoxide gas in the gaseous mixture have been combined and reported as chlorine monoxide.

EXAMPLE 1

Sodium hydroxide solution having 50% by weight of NaOH was continuously fed to an atomizer located in the upper portion of a cylindrical reactor. The atomizer sprayed droplets of sodium hydroxide solution, the droplets being smaller than 250 microns in size, into a gaseous mixture of chlorine maintained at a temperature of 98° C. The molar ratio of chlorine to sodium hydroxide in the reaction mixture was maintained at 30:1 to provide sufficient chlorine to completely react with the sodium hydroxide to produce hypochlorous acid vapor and dry solid sodium chloride particles. The larger particles of sodium chloride settled in the bottom of the reactor. A gaseous mixture having an average concentration of 19.2 parts by volume of chlorine monoxide gas (including hypochlorous acid vapor), 65.1 parts by volume of chlorine, 15.7 parts by volume (15.7 mole percent) of water vapor, and fine particles of dry sodium chloride was continuously removed from the reactor and passed through a cyclone. The fine particles of sodium chloride were recovered in the cyclone and the gaseous mixture fed to a vertical shell and tube heat exchanger maintained at a temperature of about 0° C. and a pressure of about −28 torr gauge. A portion of the chlorine monoxide gas and substantially all of the water vapor was condensed to produce an aqueous hypochlorous acid solution. An uncondensed gas mixture containing an average of 20.7 percent by volume of chlorine monoxide gas, 78.9 percent by volume of chlorine and, 0.4 percent by volume of water vapor was continuously removed from the condenser. The uncondensed gas mixture was passed through a heat exchanger to raise the temperature to about 140° C. The heated gaseous mixture of Cl₂O and Cl₂ was fed to the reactor to supply a portion of the chlorine gas required as the reactant.

A solution of hypochlorous acid was recovered from the condenser having an average concentration of 49.7 percent by weight of HOCl. The concentrated HOCl solution contained about 0.4 percent by weight of dissolved chlorine. A yield of 80 percent based on sodium hydroxide was obtained. Solid salt particles recovered from the reactor had an average concentration of 5.9 percent by weight of chlorate and had a moisture content of 1 percent by weight.

EXAMPLE 2

A gaseous mixture containing an average concentration of 180.7 parts by weight of chlorine monoxide, 384.5 parts by weight of $Cl_2$, and 60.3 parts by weight of water vapor was continuously passed through a cyclone separator to remove any entrained solid particles of alkali metal chloride. The solid-free gaseous mixture at a temperature of 85°–90° C. was passed through a vertical shell and tube heat exchanger maintained at a temperature of about 0° C. and a pressure of about 3–4 torr to condense a portion of the chlorine monoxide and substantially all of the water vapor to produce an aqueous hypochlorous acid solution containing 45 to 50 percent by weight of HOCl. The hypochlorous acid solution had a pH of about 1 and the dissolved chlorine concentration was determined to be about 1 percent by weight. An uncondensed gas mixture containing an average of 141.9 parts by weight of $Cl_2O$, 384.1 parts by weight of $Cl_2$, and 0.5 parts by weight of water was continuously removed from the condenser. The uncondensed gas mixture was passed through a heat exchanger to raise the temperature to about 100° C. and recycled to a generator used to produce the gaseous mixture of chlorine monoxide.

EXAMPLE 3

The process of Example 1 was repeated and a hypochlorous acid solution produced containing 51.42% by weight of HOCl.

EXAMPLE 4–7

A concentrated hypochlorous acid solution containing 44.91% by weight of HOCl was produced by the process of Example 1. Aliquots (10 ml) of this solution were stored in constant temperature baths at 10° C. and 15° C. Hypochlorous acid solutions having concentrations of 39.93% HOCl, 34.96% HOCl, and 33.57% HOCl were also prepared by dilution of the 44.91% HOCl solution with deionized water and aliquots stored in the constant temperature baths. The density of the concentrated solutions was determined by weighing an aliquot (to 0.0001 g). The results, given in Table I below, are the average of three determinations for each concentration.

COMPARATIVE EXAMPLES A,B,C, AND D.

The procedure of Example 3 was repeated using hypochlorous acid solutions containing 29.48%, 24.2%, 19.65% and 10.5% by weight of HOCl prepared by dilution of the 44.91% HOCl solution. The results are given in Table I below:

TABLE I

| | Density of Hypochlorous Acid Solutions: | | |
|---|---|---|---|
| Example No. | HOCl Concn. (% by weight) | g/ml at 10° C. | g/ml at 15° C. |
| 4 | 44.91 | 1.192 | 1.191 |
| 5 | 39.93 | 1.171 | 1.163 |
| 6 | 34.96 | 1.147 | 1.14 |
| 7 | 33.57 | 1.144 | 1.138 |
| Compare A | 29.48 | 1.118 | 1.115 |
| Compare B | 24.2 | 1.098 | 1.095 |
| Compare C | 19.65 | 1.079 | 1.076 |
| Compare D | 10.5 | 1.036 | 1.034 |

EXAMPLES 8–10

The optical absorbance of a concentrated hypochlorous acid solution (45.0 wt. % HOCl, reddish yellow in color) was determined at a wave length of 550 nm using a 5 cm. quartz cell at 25° C. on a UV-visible spectrophotometer (Perkins Elmer, Model 303). The solution was diluted with distilled water to obtain concentrations of 40% and 35% by weight of HOCl. The optical absorbance of each of these solutions was similarly determined. The solutions took on a more yellowish color as dilution increased. The chlorine monoxide content of the HOCl solutions was calculated using the following formula;

$$WT\ \%\ Cl_2O = k[WT\ \%\ HOCl]^2/d.$$

where $K = 1.12 \times 10^{-3}$ and d = density. The value of the factor is based on the known quantification constant for hydrolysis of $Cl_2O$.

The results are given in Table II below:

COMPARATIVE EXAMPLES E AND F

The concentrated hypochlorous acid solution of example 7 was further diluted with distilled water to provide hypochlorous acid solutions having 22.5 and 11.25% by weight of HOCl. The procedure of Example 7–9 was repeated and the results are given in Table II below:

TABLE II

| Example Number | Concentr. Wt. % HOCl* | Density g./ml (10° C.) | HOCl M/L | Absorbance @ 550 nm (cm) | Cl₂O Wt. % (0° C.) |
|---|---|---|---|---|---|
| 8 | 45.0 | 1.19 | 10.2 | 0.112 | 2.4 |
| 9 | 40.0 | 1.17 | 8.9 | 0.056 | 1.9 |
| 10 | 35.0 | 1.15 | 7.7 | 0.034 | 1.4 |
| Comp. E | 32.0 | 1.14 | 7.0 | 0.025 | 1.2 |
| Comp. F | 22.5 | 1.10 | 4.7 | 0.09 | 0.58 |
| Comp. G | 11.25 | 1.05 | 2.1 | 0.08 | 0.14 |

*Total of HOCl and Cl₂O expressed as HOCl.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A process for producing hypochlorous acid solutions which comprises:
   a) reacting droplets of an aqueous solution of an alkali metal hydroxide with gaseous chlorine in a reaction mixture in which the molar ratio of chlorine to the alkali metal hydroxide is at least about 22:1, b). vaporizing the reaction mixture to separate a gaseous mixture comprised of hypochlorous acid vapor, chlorine monoxide gas, chlorine gas, and water vapor from solid particles of an alkali metal chloride, c) condensing the gaseous mixture to produce a solution of hypochlorous acid and an uncondensed gaseous mixture comprising chlorine and chlorine monoxide, d) separating the uncondensed gaseous mixture from the solution of hypochlorous acid, and, e) feeding the uncondensed gaseous mixture to step a).

2. The process of claim 1 in which the concentration of water vapor in the gaseous mixture comprised of hypochlorous acid vapor, chlorine monoxide gas, chlorine gas, and water vapor is from about 10 to about 25 mole percent.

3. The process of claim 2 in which the reaction temperature is maintained in the range of from about 75° to about 150° C.

4. The process of claim 3 in which the molar ratio of gaseous chlorine to the alkali metal hydroxide is from 25:1 to about 200:1.

5. The process of claim 1 in which the alkali metal hydroxide is selected from the group consisting of sodium hydroxide, potassium hydroxide, lithium hydroxide, and mixtures thereof.

6. The process of claim 5 in which the alkali metal hydroxide is sodium hydroxide.

7. The process of claim 5 in which the molar ratio of chlorine gas to alkali metal hydroxide is from about 25:1 to about 200:1.

8. The process of claim 7 in which the reaction temperature is maintained in the range of from about 90° to about 140° C.

9. The process of claim 8 in which the molar ratio of chlorine to sodium hydroxide is from about 30:1 to about 60:1.

10. The process of claim 4 in which the aqueous solution of alkali metal hydroxide has concentrations of from about 40 to about 80 percent by weight of alkali metal hydroxide.

11. The process of claim 10 in which the hypochlorous acid solution contains from about 35 to about 60 percent by weight of HOCl.

12. The process of claim 1 in which the concentration of chlorine monoxide in the uncondensed gaseous mixture is from about 5 to about 25 percent by volume.

13. The process of claim 12 in which the uncondensed gaseous mixture is heated to a temperature in the range of from about 75° to about 150° C.

14. The process of claim 1 in which the gaseous mixture is condensed at a temperature in the range of from about −5° to about +10° C.

15. The process of claim 14 in which the gaseous mixture is condensed at temperatures in the range of from about −5° to about +5° C.

16. The process of claim 15 in which in which the water vapor concentration in the gaseous mixture is from about 13 to about 20 mole percent.

17. The process of claim 16 in which the hypochlorous acid solution contains from about 40 to about 55 percent by weight of HOCl.

18. The process of claim 1 in which, prior to step c), the gaseous mixture is passed through a separation means.

19. The process of claim 12 in which the solid alkali metal chloride particles have a chlorate concentration of less than about 10 percent by weight.

20. The process of claim 19 in which the solid alkali metal chloride particles have a moisture content of less than about 1 percent by weight.

21. The process of claim 18 in which the separation of the solid particles of alkali metal chloride employs as a separator means a gas filter medium or a cyclone.

22. The process of claim 21 in which the alkali metal chloride is sodium chloride.

23. The process of claim 21 in which the separator means is a cyclone.

* * * * *